United States Patent [19]

Nolf

[11] 4,364,419

[45] Dec. 21, 1982

[54] HEAT-RECOVERABLE WRAPAROUND CLOSURE

[75] Inventor: Jean-Marie E. Nolf, Hamme-mille, Belgium

[73] Assignee: Raychem Corporation, Menlo Park, Calif.

[21] Appl. No.: 240,528

[22] Filed: Mar. 4, 1981

[30] Foreign Application Priority Data

Mar. 14, 1980 [GB] United Kingdom ................. 8008703

[51] Int. Cl.³ .......................................... A44B 21/00
[52] U.S. Cl. .................................... 138/167; 138/178; 138/99; 174/DIG. 8; 24/257; 24/259 FS
[58] Field of Search .................... 138/97, 99, 156, 158, 138/167, 178; 174/DIG. 8; 428/913; 24/257, 259 R, 259 FS, 260; 403/273

[56] References Cited

U.S. PATENT DOCUMENTS

| | | | |
|---|---|---|---|
| 3,455,336 | 7/1969 | Ellis | 138/99 X |
| 3,542,077 | 11/1970 | Muchmore | 138/99 |
| 4,181,814 | 1/1980 | Smith . | |

FOREIGN PATENT DOCUMENTS

| | | | |
|---|---|---|---|
| 659845 | 6/1965 | Belgium | 24/259 FS |
| 2044086 | 3/1972 | Fed. Rep. of Germany . | |
| 2411610 | 9/1974 | Fed. Rep. of Germany . | |
| 2441668 | 3/1976 | Fed. Rep. of Germany . | |
| 2543358 | 4/1976 | Fed. Rep. of Germany . | |
| 2652014 | 5/1977 | Fed. Rep. of Germany . | |
| 2831029 | 2/1979 | Fed. Rep. of Germany . | |
| 2739330 | 8/1979 | Fed. Rep. of Germany . | |
| 2820181 | 11/1979 | Fed. Rep. of Germany . | |
| 1519307 | 2/1968 | France | 24/259 R |
| 1415272 | 11/1975 | United Kingdom . | |
| 1506242 | 4/1978 | United Kingdom . | |
| 1529351 | 10/1978 | United Kingdom | 138/178 |
| 2054781 | 2/1981 | United Kingdom | 174/DIG. 8 |

Primary Examiner—Stuart S. Levy
Assistant Examiner—Daniel P. Stodola
Attorney, Agent, or Firm—Edith A. Rice; Herbert G. Burkard

[57] ABSTRACT

Fastener for a heat-recoverable wraparound sleeve, rigid enough at ambient temperatures to be slid over abutting rails of the sleeve but flexible enough at the recovery temperature of the sleeve to accommodate sharp transitions. The fastening has an elongate member rigid at ambient temperature and flexible at the recovery temperature, and a plurality of clamps extending transversely from the sleeve and which at least retain their clamping effect at the recovery temperature. The clamps can be covered by a protective material.

21 Claims, 6 Drawing Figures

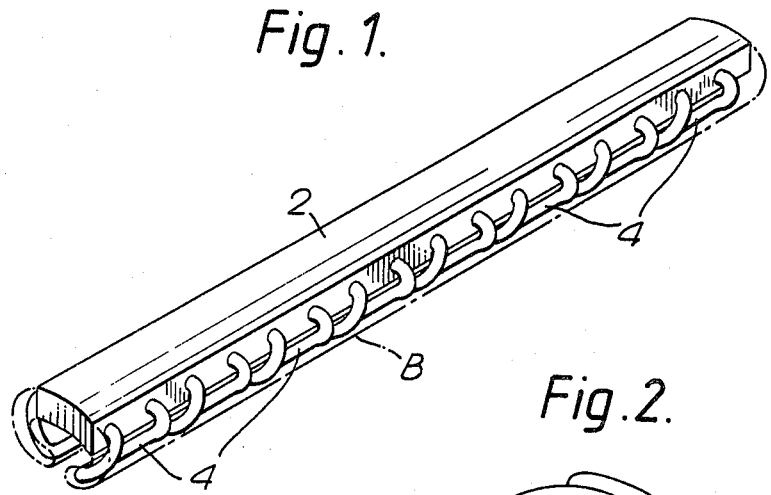
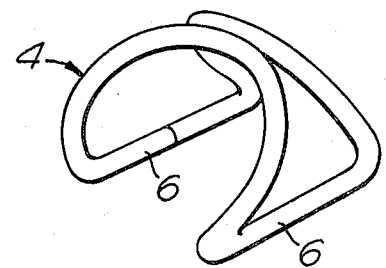
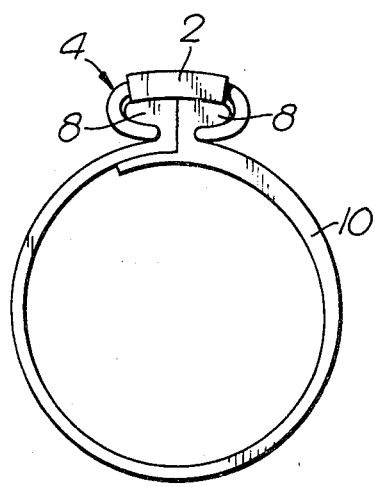

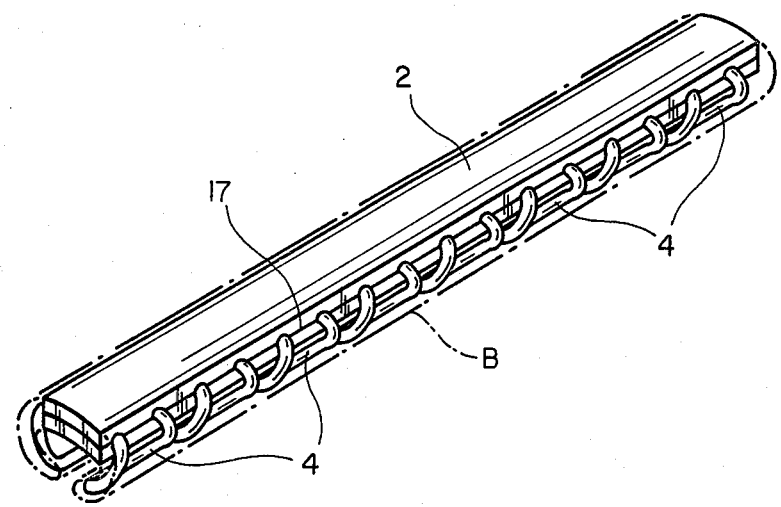
FIG_6

HEAT-RECOVERABLE WRAPAROUND CLOSURE

DESCRIPTION

This invention relates to a heat-recoverable wraparound closure, and in particular to fastening means therefore and its method of manufacture.

A heat-recoverable wraparound closure comprises a wraparound sleeve of heat-recoverable material and a fastening member. Heat-recoverable articles are articles the dimensional configuration of which may be made substantially to change when subjected to heat treatment. They may be produced by deforming a material having a dimensionally heat-stable configuration on the application of heat alone. As is made clear in U.S. Pat. No. 2,027,962, however, the original dimensionally heat-stable configuration may be a transient form in a continuous process in which, for example, an extruded tube is expanded, whilst hot, to a dimensionally heat-unstable form. Alternatively a preformed dimensionally heat-stable article may be deformed to a dimensionally heat-unstable form in a separate stage. In the production of dimensionally recoverable articles, the composition may also be cross-linked at any stage in the production process that will accomplish the desired additional dimensional recoverability. One such sleeve comprises elongate sheet material that has two ridges, or rails, therealong such that when the sheet is wrapped around an object, say a cable splice or pipe joint, the ridges abut each other. The associated fastening member is an elongate metal channel of substantially C-shape section, and is slid over the abutting rails to secure the sleeve against unwrapping. After the sleeve has been wrapped around the object and the channel slid over the rail, the sleeve is heated to its recovery temperature, thereby causing it to shrink around the enclosed object. Our U.S. Pat. No. 3,455,336, which together with other patents referred to is incorporated herein by reference, discloses this type of rail and channel closure system for a recoverable sleeve.

In some instances, the closure is required to encompass a transition in lateral dimension, e.g. diameter, of the object, for example a splice between cables of different diameters, and the channel is notched transversely to endow it with flexibility so that it can be urged, for example by being mechanically deformed, to follow the contour of the splice as the sleeve shrinks around it, see for example our U.K. Pat. No. 1,529,351. However, it has been found that when the closure is required to encompass rather sharp transitions in the diameter of an object, the flexibility of such a channel may be insufficient to allow it adequately to follow the contour. Difficulty is experienced in making the metal channel thinner or of more flexible material, since it is also required to be rigid enough during and after cooling of the sleeve to hold the sleeve rails together. If, as is usually the case, the sleeve is not fully recovered, i.e. is prevented by the object from returning completely to its heat stable configuration, quite large forces can be exerted on the channel on cooling. Furthermore, a flexible channel member may be difficult to slide into position along the rails of the sleeve, this being particularly so with long channel members, which have an increased tendency to buckle.

It is an object of the present invention to provide a fastening member for a heat-recoverable wraparound sleeve with improved ability to follow sharp transitions of an enclosed object, but which need not suffer from the disadvantage set out above.

In accordance with one aspect of the present invention, there is provided fastening means for a heat-recoverable wraparound sleeve the fastening means comprising an elongate member formed from a material that is substantially rigid at ambient temperature and that is flexible at the recovery temperature of the sleeve, and a plurality of clamping elements extending transversely from the elongate member, and having converging portions which can engage the sleeve to effect fastening thereof, and which are substantially rigid at the recovery temperature of the sleeve.

The clamping elements may be discrete.

The clamping elements may be formed of a metal, which term includes an alloy, such as stainless steel. Alternatively, the clamping elements may be formed of a heat-recoverable metal or alloy, for example a B-brass, especially that sold by Raychem under its Trade Mark BETALLOY, see for example U.K. Pat. Nos. 1,490,181, 1,490,182 and 1,558,194. The heat-induced change of configuration that is a feature of such recoverable materials, may be used to provide pinching of the sleeve by the fastening means as it cools, thereby enhancing securement of the closure about an object. It is not necessary in this case to slide the fastening means longitudinally onto the rails of the outer sleeve, as is generally the case with non recoverable clamping elements.

The clamping elements may be coated with electrically insulative or other protective material, for example suitable polymeric material.

The material constituting the elongate member may be a polymer for example a thermoplastic polymer such as polyethylene or polypropylene, and may conveniently be a cross-linked polymeric material. When the recovery temperature of the sleeve is about 120° C., for example, a cross-linked polymer may be chosen that has a crystalline melting temperature of about 110° C. Only a relatively low degree of cross-linking is required, that is sufficient to prevent melting of the polymer at temperatures to which it is heated for recovery of the sleeve, thereby obtaining maximum flexibility at such elevated temperature. The use of a non-metallic material for the elongate member makes the fastening means particularly useful where electrically insulating properties are required.

The present invention also provides a heat-recoverable closure comprising a heat-recoverable wraparound sleeve and fastening means in accordance with the invention for fastening the said sleeve.

Also in accordance with the present invention there are provided methods of manufacturing fastening means, and of covering a substrate with a heat-recoverable wraparound closure including the fastening means.

It has been appreciated in the present invention that the above-mentioned inherently conflicting requirements that the fastening means be flexible yet rigid, occur at different temperatures and generally in different directions. That is to say, longitudinal flexibility is required at temperatures of about, say, 120° C., to which the sleeve is heated for recovery, while transverse rigidity is required before heating, at ambient room or atmospheric temperature. Rigidity may also be desirable after recovery heating. dr Fastening means, methods of manufacture, and a heat recoverable wraparound closure, each in accordance with the present invention, will now be described, by way of example, with reference to the accompanying drawings, in which;

FIG. 1 is a perspective view of the fastening means;

FIG. 2 is a perspective view of a rigid element of the fastening means;

FIG. 3 is an end view of the closure comprising the fastening means of FIG. 1;

FIG. 6 shows an alternative design.

Figure 4:
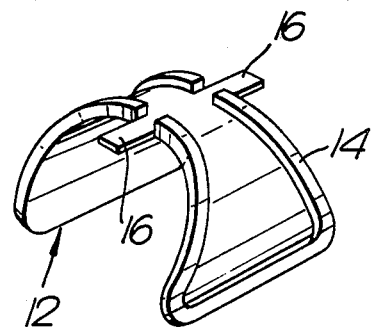
FIG. 4 is a perspective view of an alternative clamping element of the fastening means.

Referring to FIGS. 1 to 3, the fastening means or channel comprises an elongate, preferably rectangular-sectioned, strip 2 and eight discrete metal clamping elements 4. The precise shape of the clamping elements 4 is not critical provided that they converge so that they can engage a wrap-around sleeve beneath its rails; we therefore prefer the elements 4 to be so shaped that the fastening means, in envelope, has a C-shaped transverse cross-section. The strip 2 is formed from a cross-linked thermoplastic polymer that has a crystalline melting temperature of about 110° C., and that is substantially rigid at room temperature. The metal elements 4 may be formed from stainless steel and extend through the strip 2, projecting from opposite sides thereof with longitudinal portions 6 spaced below and parallel to the plane of the strip 2.

In FIG. 3, the fastening means is shown fitted over abutting rails 8 of a heat-recoverable wraparound sleeve 10. It will be appreciated that the metal elements 4 of the fastening means extend around the edges of the rails 8 so as to hold them together and prevent the sleeve 10 unwrapping.

The sleeve 10 is wrapped around an object, for example a cable splice, the rails 8 brought together, and the rigid fastening means slid thereover. The sleeve 10 is then heated to its recovery temperature, above its crystalline melting temperature of about 120° C., at which temperature it recovers and shrinks on to the enclosed splice. At its recovery temperature, the thermoplastic strip 2 is very flexible, being constrained by the metal elements 4. As the sleeve 10 shrinks over the cable splice, which is assumed to have a sharp transition so that the soft strip 2 conforms to the transition so that the sleeve 10 and the strip 2 are maintained in close contact with the splice at all longitudinal positions. The rigidity of the metal elements 4 even at this elevated temperature ensures that the sleeve 10 is maintained in its closed configuration. After the sleeve 10 has been fully recovered and is allowed to cool, the strip 2 also cools in its new configuration and thus becomes more rigid again.

As can be seen from FIG. 2, the metal element 4 is a wire element whose ends abut in one of the longitudinal portions 6. The thickness of the wire forming the elements is chosen to provide the required strength for the fastening channel at temperatures above as well as below the crystalline melting temperature of the strip 2. Typically, the steel wire has a diameter of 1.5 mm and it substantially completely fills the neck cavity between the rails 8 and the outer surface of the sleeve 10 (FIG. 3). The rail necks are thus secured close to the surface of the splice so that any residual or hoop stresses in the sleeve 10 are directed on to the elements 4, thus minimizing the tendency of the sleeve 10 to lift away from the enclosed splice, which could possibly result in the rails 8 pulling out of the channel member at relatively high unresolved recovery of the sleeve.

FIG. 4 shows an alternative form of the clamping elements of the fastening means. Metal elements 12 are pressed from sheet material, and preferably have an edge 14 thereof thickened to enhance its rigidity. The elements can be made with such reinforced edges, or they can be made plain and later reinforced. The elements 12 can conveniently be pressed from sheet material as a contiguous series of elements interconnected by lugs 16. The lugs 16 serve to hold the elements 12 correctly spaced apart during a subsequent manufacturing process in which the thermoplastic strip material 2 is applied to them, and may be cut by a punching operation through the polymeric material 2 at completion of the manufacturing.

Figure 5:
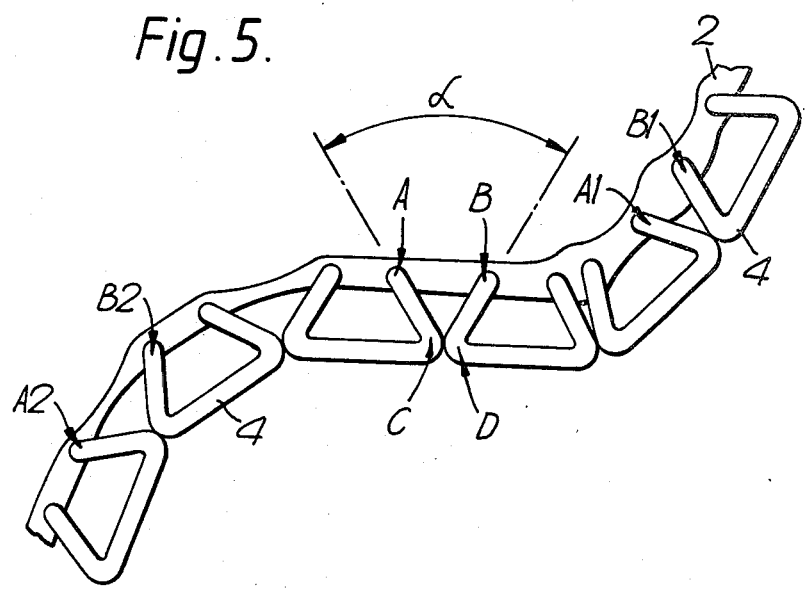
FIG. 5 is a side view of the fastening means demonstrating its ability to conform to sharp contour transitions.

The extent to which the fastening means can conform to a transition in the diameter of an enclosed splice will now be discussed with reference to FIG. 5. It is to be noted that in the straight configuration, shown in FIG. 1, corners C and D of adjacent clamping elements 4 are in contact. A and B denote the portions of adjacent metal elements 4 that extend through the polymeric strip 2. The linear distance between the point A and B, and the angle $\alpha$ between the limbs A,C and B,D are chosen in accordance with the minimum radius of curvature expected to be encountered and with the flexibility of the strip 2 when heated above its crystalline melting temperature, such that, at one extreme, the compression shown at A1 and B1, and at the other extreme, the expansion shown at A2 and B2, are acceptable to the polymeric material. In other examples, the polymeric material could simply bend. These considerations determine the extent to which the present fastening means can follow the contour of an enclosed object.

More or fewer clamping elements than the eight referred to in FIG. 1 may be provided and, typically, there would be eighty such elements per meter length of the elongate member. It may be desirable to encapsulate the clamping element, for example to provide electrical insulation of metal elements or to provide environmental protection. This may conveniently be done by encapsulating with the same material, for example, non-conductive polymer, that is used to form the elongate member, as shown, for example, by the broken line B in FIG. 1. Such complete encapsualtion would give the channel a generally C-chaped section of smooth continuous contour. The thicker the mid-portion, i.e. elongate member portion, of the channel relative to the two outer limb portions, i.e. containing the clamping elements, the greater is the rigidity of the channel. Complete encapsulation in this way provides a fastening channel of greater rigidity than the channel shown in full outline in FIG. 1. Furthermore, a less expensive material than stainless steel, for exammple ordinary steel, may be employed since its non-corrosive properties would not then be required, with a consequent saving in cost. As an alternative to the complete encapsulation, the clamping elements may be covered individually, for example by a coating or sleeving.

As a further alternative, the clamping elements secured in the thermoplastic material may be slightly resilient and arranged to be secured in a displaced configuration by the elongate member or by an additional covering at room temperature, and to be released when the elongate member becomes flexible at elevated temperature, so that the elements return to another configuration in which they exert an increased clamping force on the closure member. In another alternative, the clamping elements may be formed from heat-recoverable metal, for example that sold by Raychem under the Trade Mark Betalloy, whereby at room temperature the fastening means can be slid quite easily along the rails of the wraparound sleeve, and on heating the clamping elements again exert an increased clamping force on the rails, thus securing the sleeve against unwrapping. In all of these alternatives, we regard the clamping elements as being substantially rigid since they are capable of resisting the recovery forces of the sleeve: the term substantially rigid is not intended exclusively to imply that no distortion whatsoever occurs.

In one mode of manufacture the elongate member may be moulded with cavities therein subsequently to receive the clamping elements.

The elongate member may be formed from two, or more, overlying strips, and the clamping elements may be located between two strips and secured therein, for example by fusing together of the strips and forming them around the elements. It will be appreciated that with the discrete clamping elements, as shown for example in FIGS. 2 and 4, the elongate member can conveniently be cut to any length between the discrete members without there being any jagged edges remaining which could otherwise foul the rails of the wraparound sleeve.

The present invention thus provides a fastening means that is relatively rigid at room temperature, such that even in long lengths it can easily be slid over the rails of a wraparound sleeve, and yet which is flexible at high temperature so as to allow it adequately to conform to sharp transitions in the enclosed object.

I claim:

1. Fastening means for holding together opposite edge regions of a heat-recoverable wraparound sleeve, the fastening means comprising:
   an elongate member which comprises a material that is substantially rigid at ambient temperature and that is flexible at the recovery temperature of the sleeve; and
   a plurality of discrete clamping elements each having a pair of opposing generally U-shaped sections integrally interconnected, each of said U-shaped sections extending transversely from the elongate member and converging to engage said opposite edge regions of the wrap-around sleeve to hold said opposite edge regions together, said clamping elements being substantially rigid at the recovery temperature of the sleeve.

2. Fastening means according to claim 1, wherein the clamping elements are formed of metal.

3. Fastening means according to claim 2, wherein the metal is heat-recoverable.

4. Fastening means according to claim 3, wherein the metal is a B-brass.

5. Fastening means according to claim 4, wherein the clamping elements are covered with a protective material which is electrically insulative or is environmentally protective.

6. Fastening means according to claim 5, wherein the protective material is a polymeric material.

7. Fastening means according to claim 5, wherein the protective material extends around the clamping elements individually.

8. Fastening means according to claim 5, wherein the protective material covers all the clamping elements integrally.

9. Fastening means according to claim 1, wherein the elongate member is formed from a polymer.

10. Fastening means according to claim 9, wherein the clamping elements are covered by a protective polymer which is the same as the polymer of the elongate member.

11. Fastening means according to claim 9 or 10, wherein the polymer is thermoplastic.

12. Fastening means according to claim 9 or 10, wherein the polymer is cross-linked.

13. Fastening means for holding together opposite edge regions of a heat-recoverable wraparound sleeve, the fastening means comprising:
   an elongate member which comprises a material that is substantially rigid at ambient temperature and that is flexible at the recovery temperature of the sleeve; and
   a plurality of clamping elements substantially rigid at the recovery temperature of the sleeve extending transversely from the elongate member and having converging portions which can engage said opposite edge regions to hold them together, wherein each clamping element comprises a wire element having longitudinal portions extending along each side of the elongate member spaced below and parallel to said elongate member, said portions being interconnected by a further portion integral therewith that passes through the elongate member.

14. Fastening means according to claim 1, wherein the clamping elements are pressed from sheet material.

15. Fastening means according to claim 14, wherein each clamping element has a reinforced edge to enhance its rigidity.

16. Fastening means according to claim 1, 13 or 14, the envelope of which is substantially C-shape in transverse cross-section.

17. Fastening means according to claim 1, 13 or 14, wherein the clamping elements are embedded in a material which at ambient temperature holds the elements in a distorted configuration, and which on heating allows the elements to relax to increase their clamping action.

18. Fastening means according to claim 1, 13 or 14, wherein said clamping elements are inserted into cavities which are molded into said elongate member.

19. Fastening means for holding together opposite edge regions of a heat-recoverable wraparound sleeve, the fastening means comprising:
   an elongate member which comprises a material that is substantially rigid at ambient temperature and that is flexible at the recovery temperature of the sleeve; and
   a plurality of clamping elements substantially rigid at the recovery temperature of the sleeve extending transversely from the elongate member and having converging portions which can engage said opposite edge regions to hold them together, wherein the elongate member is formed from at least two overlying strips, and the clamping elements pass between two adjacent strips.

20. A heat-recoverable wraparound sleeve including fastening means according to claim 1, 13 or 14.

21. A cable splice enclosed in a heat-recoverable wraparound sleeve according to claim 20.

* * * * *

UNITED STATES PATENT AND TRADEMARK OFFICE
CERTIFICATE OF CORRECTION

PATENT NO. : 4,364,419

DATED : December 21, 1982

INVENTOR(S) : Nolf

It is certified that error appears in the above-identified patent and that said Letters Patent are hereby corrected as shown below:

On the title page:

In the Abstract, middle of paragraph, sentence beginning with "The fastening..." should read -- The fastener --.

In column 2, line 65 - reads "...recovery heating. dr" should read -- ...recovery heating --.

In column 4, line 46 - reads "encapsualtion" - should read -- encapsulation --.

Signed and Sealed this

Fifth Day of February 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,364,419

DATED : December 21, 1982

INVENTOR(S) : Jean-Marie E. Nolf

It is certified that error appears in the above-identified patent and that said Letters Patent is hereby corrected as shown below:

In Column 5, line 21, after "strips" insert -- at the interface 17 as illustrated in Figure 6 --.

Signed and Sealed this

Twenty-third Day of April 1985

[SEAL]

Attest:

DONALD J. QUIGG

Attesting Officer

Acting Commissioner of Patents and Trademarks